United States Patent
Natsumeda et al.

(10) Patent No.: US 11,543,561 B2
(45) Date of Patent: Jan. 3, 2023

(54) ROOT CAUSE ANALYSIS FOR SPACE WEATHER EVENTS

(71) Applicant: NEC Laboratories America, Inc., Princeton, NJ (US)

(72) Inventors: Masanao Natsumeda, Princeton Junction, NJ (US); Haifeng Chen, West Windsor, NJ (US)

(73) Assignee: NEC Corporation

( * ) Notice: Subject to any disclaimer, the term of this patent is extended or adjusted under 35 U.S.C. 154(b) by 530 days.

(21) Appl. No.: 16/665,307

(22) Filed: Oct. 28, 2019

(65) Prior Publication Data
US 2020/0142097 A1    May 7, 2020

Related U.S. Application Data

(60) Provisional application No. 62/753,977, filed on Nov. 1, 2018.

(51) Int. Cl.
*G01W 1/10* (2006.01)
*G06K 9/62* (2022.01)

(52) U.S. Cl.
CPC ........... *G01W 1/10* (2013.01); *G06K 9/6215* (2013.01); *G06K 9/6218* (2013.01)

(58) Field of Classification Search
CPC ........ G01W 1/10; G01W 1/00; G06K 9/6215; G06K 9/6218
See application file for complete search history.

(56) References Cited

U.S. PATENT DOCUMENTS

| | | | |
|---|---|---|---|
| 8,193,968 B1 * | 6/2012 | Kia ........................ | B64G 3/00 342/26 A |
| 2014/0222255 A1 * | 8/2014 | You ........................ | B64G 1/24 701/3 |
| 2016/0154802 A1 | 6/2016 | Yan et al. | |

OTHER PUBLICATIONS

Marta Pantoquilho et al., "Online and Offline Monitoring and Diagnosis of Spacecraft and Space Weather Status", in Proceedings of EUROFUSE Workshop on Data and Knowledge Engineering, Warszawa Poland, Sep. 2004.

Takehisa Yairi et al., "A Data-Driven Health Monitoring Method for Satellite Housekeeping Data Based on Probabilistic Clustering and Dimensionality Reduction", IEEE Transactions on Aerospace and Electronic Systems vol. 53, No. Jun. 3, 2017.

* cited by examiner

*Primary Examiner* — James M Pontius
(74) *Attorney, Agent, or Firm* — Joseph Kolodka

(57) ABSTRACT

Methods and systems for preventing spacecraft damage include identifying a space weather event that corresponds to a spacecraft system failure. A spacecraft system is determined that causes the spacecraft system failure, triggered by the space weather event. A corrective action is performed on the determined spacecraft system to prevent spacecraft system failures from being triggered by future space weather events.

18 Claims, 4 Drawing Sheets

ROOT CAUSE ANALYSIS FOR SPACE WEATHER EVENTS

RELATED APPLICATION INFORMATION

This application claims priority to 62/753,977, filed on Nov. 1, 2018, incorporated herein by reference herein its entirety.

BACKGROUND

Technical Field

The present invention relates to root cause analysis and, more particularly, to the determination of whether failures in spacecraft are the result of space weather events.

Description of the Related Art

Spacecraft are subject to space weather, which is the variable conditions of the sun and in outer space. Space weather can affect the performance and reliability of systems on a spacecraft and is a major source of failures. Spacecraft can include many sensors, such that the data collected from those sensors has high dimensionality. In addition, important patterns can provide many different kinds of signals, in some cases providing a large signal, and in some cases appearing as minute changes. Furthermore, the interplay between the type of space weather and the condition of the spacecraft makes the relationship between cause and effect difficult to determine. Analyses that depend on pre-defined rules are not adequate to address the complexity of space weather.

SUMMARY

A method for preventing spacecraft damage include identifying a space weather event that corresponds to a spacecraft system failure. A spacecraft system is determined that causes the spacecraft system failure, triggered by the space weather event. A corrective action is performed on the determined spacecraft system to prevent spacecraft system failures from being triggered by future space weather events.

A system for preventing spacecraft damage includes a hardware processor and a memory that is coupled to the hardware processor. The memory stores executable program code that includes a classifier, configured to identify a space weather event that corresponds to a spacecraft system failure, and a task manager, configured to determine a spacecraft system that causes the spacecraft system failure, triggered by the space weather event, and to perform a corrective action on the determined spacecraft system to prevent spacecraft system failures from being triggered by future space weather events.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Embodiments of the present invention provide root cause analysis for space weather events. The present embodiments analyze a subset of the multivariate time series generated by a variety of sensors. Two different datasets are analyzed separately. In spacecraft, there are many different systems, each contributing different attributes to a model of the spacecraft. Since the complexity of computation increases as a polynomial or exponential with the number of attributes in a model, reducing the number of attributes in a model can greatly decrease the computational cost of modeling the spacecraft. Meanwhile, those attributes may generate many similar time series, bringing similar observations at once. This complexity can make it difficult for users to understand the analysis results.

Subsets of attributes can be defined automatically. The present embodiments use both normal data and abnormal data, which is data collected during an abnormal situation, such as system failures within the spacecraft. It should be noted that adverse space weather activity does not always cause failure—the condition of the spacecraft also plays a role. The present embodiments find patterns in the space weather at the time of a system failure and then analyze the telemetry data to find differences in spacecraft under the same or similar situation in terms of space weather condition. This helps users identify the root cause. For example, the space weather event can be a trigger of the failure, with the root cause being the spacecraft's own systems.

Figure 1:
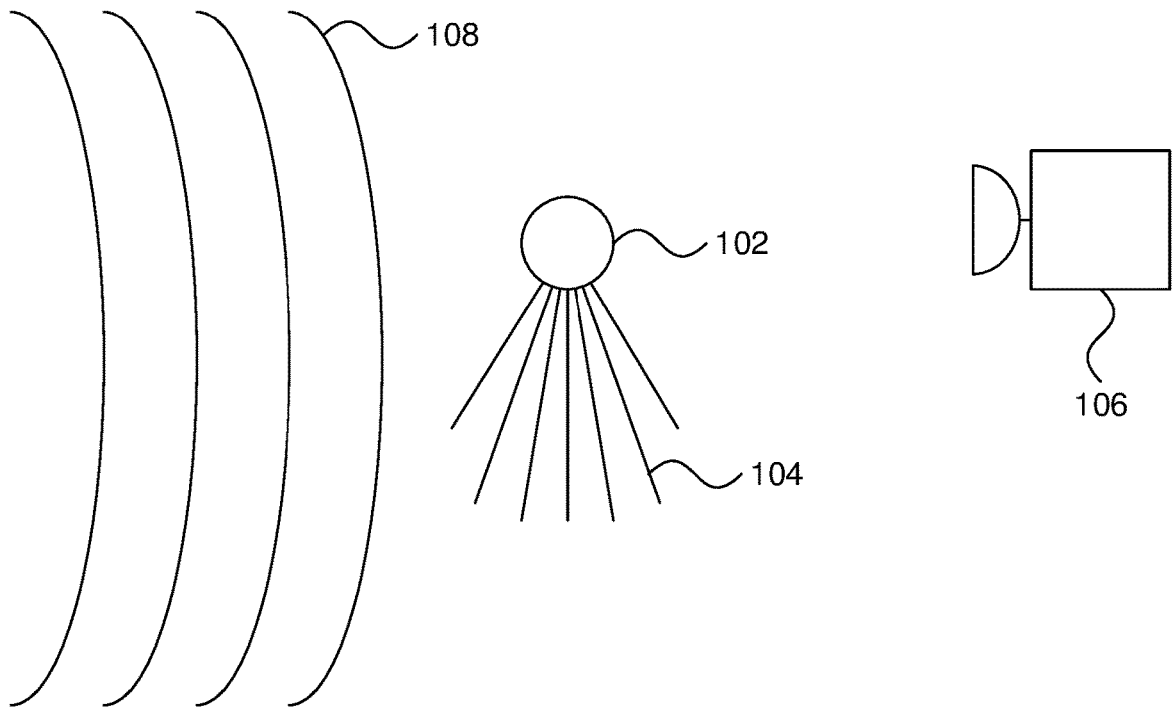
FIG. 1 is a diagram of a spacecraft that is subject to space weather, with sensors collecting time series data related to space weather and spacecraft telemetry in accordance with an embodiment of the present invention.

Referring now to FIG. 1, a diagram of spacecraft in the context of space weather is shown. In particular, a spacecraft 102 is shown. The spacecraft 102 is depicted as being an unmanned satellite, but it should be understood that the spacecraft 102 can be any manned or unmanned spacecraft that is positioned in space. As used herein, "space" is used to refer to positions where space weather 108 has a significant effect on the operation of the spacecraft 102. In some embodiments, the Karman line can be used to identify a boundary for "space," but it should be understood that any appropriate definition for space can be used instead.

The spacecraft 102 includes one or more sensors 104. These sensors 104 measure operational characteristics of the spacecraft 102 and may, additionally, measure environmental conditions. Separate sensors 106 may be terrestrial or space-based sensors that further collect information regarding environmental conditions. The sensors 104 and 106 can thereby be divided into two groups: space weather sensors that measure space conditions and telemetry sensors that measure operational information of the spacecraft 102. Each sensor 104 and 106 generates time series information that is transmitted to a central location.

The space weather 108 can include, for example, bursts of plasma (in the form of strong fluxes of charged particles), changing electromagnetic fields, coronal mass ejections, solar flares, and other solar-originating effects. Space weather 108 can also include the density of physical objects in the neighborhood of the spacecraft 102, for example in the form of dust, asteroids, and space junk.

Figure 2:
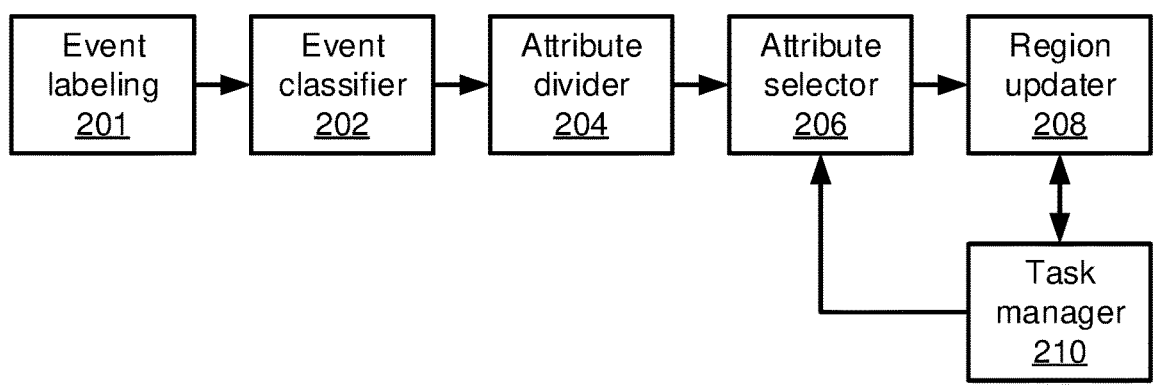
FIG. 2 is a block/flow diagram illustrating a method/system for identifying the root cause of space weather related system failures in a spacecraft in accordance with an embodiment of the present invention.

Referring now to FIG. 2, an overview of a system for identifying the root cause of a spacecraft failure is shown. Block 201 labels historical events from the sensors 104/106. Periods of time where abnormal conditions prevailed are labeled as a failure period, while periods of time just before an abnormal period can be labeled as normal. Given the labeled regions under normal and abnormal conditions, and the corresponding multivariate time series that represent telemetry data and space weather data, the present embodiments organize attribute names in the data into hierarchical structures, ordered by importance. For example, hierarchical structures can include a ranking table of attributes. The present embodiments thereby provide a list of structured attribute names on the telemetry data. The labels can be applied manually, or by any appropriate alternative system. These labels are used to build a classification model.

The event classifier 202 determines whether a failure of one or more components in the spacecraft 102 is caused by space weather 108. The event classifier 202 distinguishes between different labeled regions and determines a confidence score that has a higher value when space weather 108 is more likely to be the root cause of a failure. In some embodiments, the confidence score can be determined as the F1 score of the classifier 202. If the confidence score is higher than a predetermined threshold, then the event classifier 202 determines that the failure is caused by space weather.

Space weather data can include event logs. The event logs contain information of significance to the spacecraft and the time period during which the space weather event may affect to the spacecraft. Significance of a particular space weather event can include determinations of event type, event intensity, etc. The classifier 202 can thereby determine that the failure is caused by space weather if there is a significant event within the time period with pre-determined width.

The classifier 202 can be formed using logistic regression, which predicts a label $l_i$ of the time index i based on space weather data $X_1 = [x_0, \ldots, x_j, \ldots, x_n]$, where n indicates a number of attributes, for example sensors.

A label $l_i = 1$ if $p(X_i) > 0.5$ and $l_i = 0$ if $p(X_i) \leq 0.5$. In this case, a label with a value of 1 indicates abnormal conditions, while a label with a value of 0 indicates normal conditions, while $p(\cdot)$ can be a logistic function.

An attribute selector 206 determines scores for each attribute, based on the multivariate time series data and the labeled regions generated by the classifier 202. The attribute selector 206 gives higher value to attributes which have unique patterns that distinguish the different labeled regions. Thus, sensors that measure unique patterns will be more heavily weighted in the analysis.

An attribute divider 204 divides the attributes into groups based on their similarity, given the multivariate time series data and the labeled regions. The similarity can be measured as, for example, a Pearson correlation coefficient, which is computed for any combination of two time series. If the correlation coefficient is larger than a pre-determined threshold, its pair of attributes is determined to belong to the same group.

A region updater 208 searches similar segments of the important attributes in the space weather data in abnormal conditions and updates the normal regions to include the similar segments. The region updater 208 can use any appropriate similarity measure, such as Euclidean distance, cosine distance, and dynamic time warping distance. Important attributes are given by the attribute selector 206, based on the space weather data with labeled regions. The region updater 208 splits the time series data, from time periods with normal conditions, into segments. These segments can overlap one another.

A distance is determined between the data from time periods with abnormal conditions and the split data from time periods with normal conditions. The region updater 208 selects segments with shorter distances based on a predetermined rule and updates the selected segments as the labeled regions under normal conditions, providing new labels for the segments in question. The rule can include a predetermined number of segments, a threshold on the distance, or both.

A task manager 210 determines a subset of the multivariate time series data to be analyzed by the attribute selector 206. If the classifier 202 determines that a failure is caused by space weather 108, the task manager 210 takes the space weather data and the labeled region and begins space weather data analysis. In either case, the task manager 210 uses the telemetry data and begins telemetry data analysis. These analyses are described in greater detail below. Space weather data analysis and telemetry data analysis share the same procedure, but use different input data.

Given the multivariate time series data, the attribute divider 204 divides the attributes into groups based on similarity. The task manager 210 causes the attribute selector 206 to produce the ranking scores of each attribute. Based on ranking scores, the task manager 210 selects one attribute for each group as a representative, and then gives the multivariate time series of the representatives to the attribute selector 206. The attribute selector 206 can then produce the ranking score again for the representatives. In some embodiments, the task manager 210 can select more than one attribute for each group. In some embodiments, the number of attributes can be changed depending on the number of attributes in a group, to have larger numbers for groups with more attributes. In the case where a group has only one attribute, then that attribute is selected as the representative.

After space weather data analysis, the task manager 210 selects the top N attributes, based on the ranking score, and gives those time series data to the region updater 208. The number N is a predetermined positive integer. The region updater 208 updates the region for data segments with normal conditions. This region information is used during telemetry data analysis as labels for normal conditions. After space weather data analysis, the telemetry data analysis is performed. The present embodiments provide the attribute name table on the representatives, with ranking score for telemetry, and provide the table on the space weather data, if applicable, as well as the information on the attributes groups.

Figure 3:
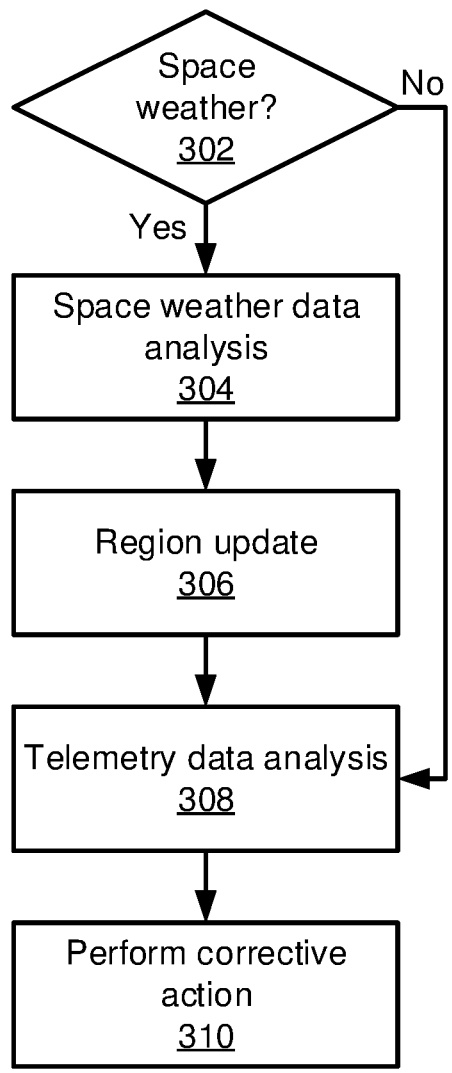
FIG. 3 is a block/flow diagram of a method for identifying and correcting the root cause of space weather related system failures in a spacecraft in accordance with an embodiment of the present invention.

Referring now to FIG. 3, a method for performing root cause analysis is shown. Block 302 uses the classifier 202 to determine whether space weather was the cause of a particular failure in a spacecraft 102. If so, block 304 performs space weather data analysis and block 306 performs a region update. If not, processing skips straight to block 308, which then performs telemetry data analysis. Both space weather data analysis and telemetry data analysis are performed by the same process, as described below.

The telemetry analysis 308 helps determine which, if any, spacecraft components were the root cause of the failure. For example, space weather events may not always cause system failures, but in the event that a system on the spacecraft is compromised or malfunctioning in some way, an otherwise harmless space weather event can cause a failure. The telemetry analysis 308 helps users identify components of the spacecraft that are affected by space weather to locate the condition that makes the spacecraft sensitive to the space weather activity. After verification, users can update the design or perform repairs.

Block 310 performs a corrective action based on the telemetry analysis of block 308. In some cases, this corrective action can include changing a system design for future spacecraft. In other cases, this corrective action can include repair or preventative measures that decrease the likelihood of future failures. Such corrective actions can include providing additional shielding or turning off sensitive components when adverse space weather is predicted.

Figure 4:
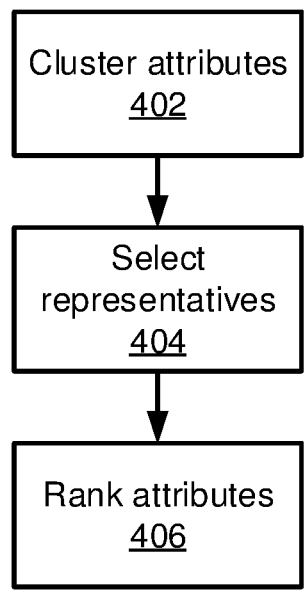
FIG. 4 is a block/flow diagram of a method for analyzing space weather data and spacecraft telemetry data in accordance with an embodiment of the present invention.

Referring now to FIG. 4, a method for performing space weather data analysis or telemetry data analysis is shown. Block 402 clusters attributes of the data according to similarity. Block 404 selects representative attributes from the respective clusters. Block 406 ranks the representative attributes.

Figure 5:
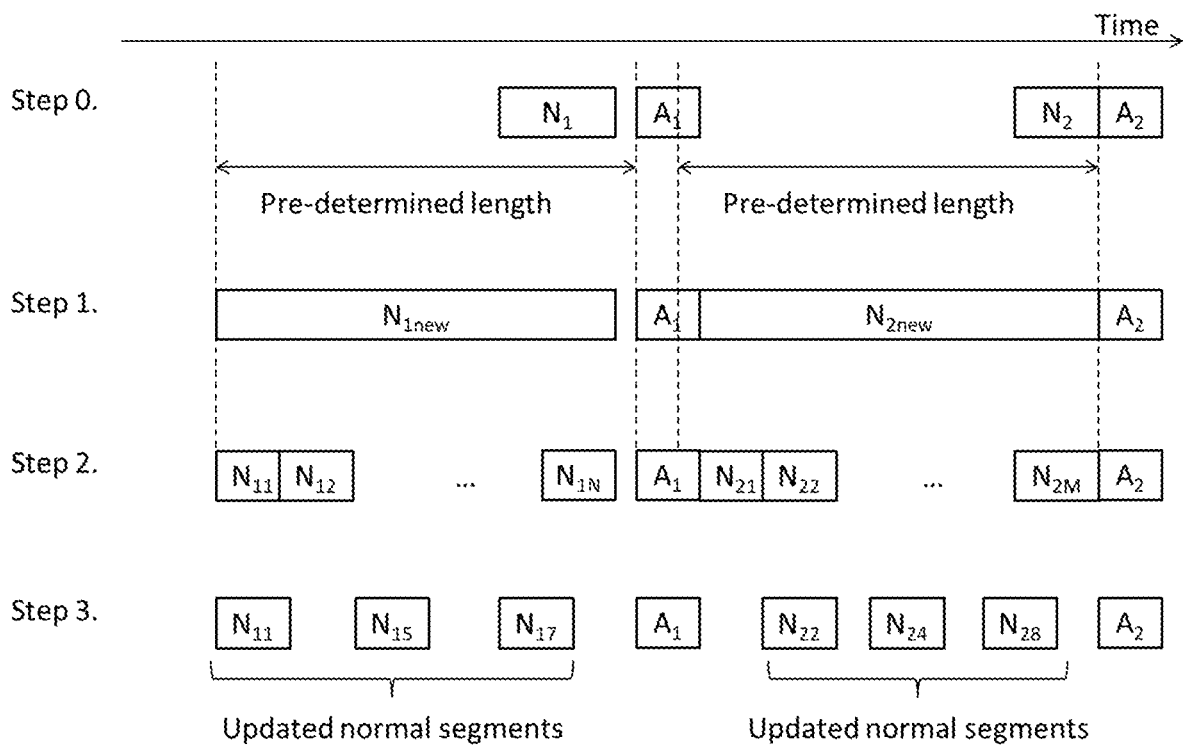
FIG. 5 is a diagram of a region update process that identifies time segments of normal activity that are associated with time segments of abnormal activity in accordance with an embodiment of the present invention.

Referring now to FIG. 5, a diagram of the change of segments through region update 306 is shown. In this example, Euclidean distance is used to determine the distance between two time segments. The distance does not represent an amount of time between the two segments, but rather a degree of similarity between them. At step 0, the region updater 208 receives multivariate time series data from the sensors 104/106, the names of important and attributes, and labels for the periods. The labels for normal periods are indicated as $N_1$ and $N_2$. The labels for abnormal periods are indicated as $A_1$ and $A_2$.

The region updater 208 holds two parameters. The first parameter is the maximum length $L_{max}$ for a normal region from the beginning of the corresponding abnormal segment. The corresponding abnormal segment is the first abnormal segment after the normal segment ends. The other parameter is a new segment selection rule that sets the maximum number of segments—three in this example.

In step 1, the region updater 208 expands the normal regions up to the maximum value $L_{max}$. If this expansion would include an abnormal segment, then the normal segment is terminated immediately after the abnormal segment. $L_{max}$ can be set to be greater than the length of a normal region, to find similar patterns in important sensors in a time period that is far away from an anomaly.

Step 2 divides the normal regions into segments of normal conditions. In step 3, the region updater 208 generates small segments with a sliding window that has the same length as the corresponding abnormal period. Step 3 computes the Euclidean distance between any combination of a time series segment for an abnormal period and a time series segment of a normal period. The region updater 208 selects, e.g., three segments for each abnormal segment that are used for telemetry data analysis. In some cases, segments can be excluded for analysis. The masked portions are defined as a set of time periods.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

Figure 6:
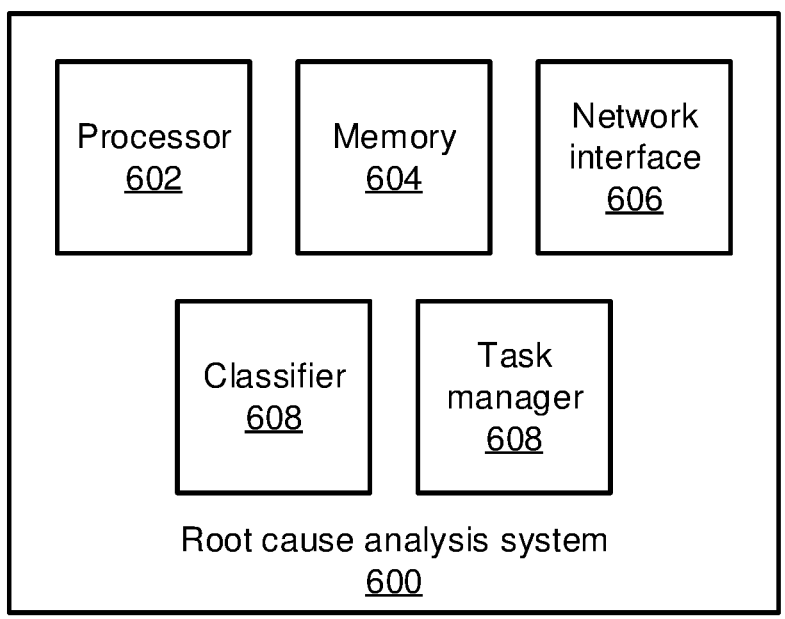
FIG. 6 is a block diagram of a system for analyzing space weather data and spacecraft telemetry data in accordance with an embodiment of the present invention.

Referring now to FIG. 6, a root cause analysis system 600 is shown. The system 600 includes a hardware processor 602 and a memory 604. A network interface 606 communicates with the spacecraft 102 and any sensors 104/106 to collect information about the spacecraft's telemetry and about space weather conditions. The network interface 606 can communicate by any appropriate wired or wireless communications medium and protocol.

A classifier 606 is used to determine whether the cause of a failure is from space weather. Based on this information, task manager 608 performs analysis on the space weather information and any spacecraft telemetry information. The task manager 608 determines whether to skip space data analysis based on, e.g., the output of the classifier. The task manager 608 furthermore performs any required corrective action, such as setting policies for preventing future system failures in adverse space weather conditions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for preventing spacecraft damage, comprising:
    identifying a space weather event that corresponds to a spacecraft system failure, including identifying time periods of system failure in a set of time series data from respective sensors;
    determining a spacecraft system that causes the spacecraft system failure, triggered by the space weather event;
    performing a corrective action on the determined spacecraft system to prevent spacecraft system failures from being triggered by future space weather events.

2. The method of claim 1, wherein determining a spacecraft system that causes the spacecraft system failure further includes identifying time periods of normal operation before respective periods of system failure.

3. The method of claim 2, wherein determining a spacecraft system that causes the spacecraft system failure further includes selecting representative segments of each time period of normal operation based on distances between a respective time period of system failure and segments of the time period of normal operation.

4. The method of claim 3, wherein the distances are calculated according to a metric selected from the group consisting of Euclidean distance, cosine distance, and dynamic time warping distance.

5. The method of claim 1, wherein determining a spacecraft system that causes the spacecraft system failure includes clustering time series according to similarity of the respective time series to form attribute clusters.

6. The method of claim 5, wherein determining a spacecraft system that causes the spacecraft system failure further includes ranking representative time segments from each cluster according to how uniqueness of the respective representative time segments.

7. The method of claim 5, wherein the similarity of time series is determined according to a Pearson correlation coefficient.

8. The method of claim 1, wherein determining a spacecraft system that causes the spacecraft system failure further includes selecting a group of sensors associated with a highest-ranked representative time segment.

9. The method of claim 1, wherein the corrective action is selected from the group consisting of shielding the determined system and turning off the system in advance of predicted adverse space weather.

10. A system for preventing spacecraft damage, comprising:
    a hardware processor;
    a memory, coupled to the hardware processor, that stores executable program code that, when executed by the hardware processor, causes the hardware processor to to identify a space weather event that corresponds to a spacecraft system failure including identification of time periods of system failure in a set of time series data from respective sensors, to determine a spacecraft system that causes the spacecraft system failure, triggered by the space weather event, and to perform a corrective action on the determined spacecraft system to prevent spacecraft system failures from being triggered by future space weather events.

11. The system of claim 10, wherein the task manager is further configured to identify time periods of normal operation before respective periods of system failure.

12. The system of claim 11, wherein the task manager is further configured to select representative segments of each time period of normal operation based on distances between a respective time period of system failure and segments of the time period of normal operation.

13. The system of claim 12, wherein the distances are calculated according to a metric selected from the group consisting of Euclidean distance, cosine distance, and dynamic time warping distance.

14. The system of claim 10, wherein the task manager is further configured to cluster time series according to similarity of the respective time series to form attribute clusters.

15. The system of claim 14, wherein the task manager is further configured to rank representative time segments from each cluster according to how uniqueness of the respective representative time segments.

16. The system of claim 14, wherein the similarity of time series is determined according to a Pearson correlation coefficient.

17. The system of claim 10, wherein the task manager is further configured to select a group of sensors associated with a highest-ranked representative time segment.

18. The system of claim 10, wherein the corrective action is selected from the group consisting of shielding the determined system and turning off the system in advance of predicted adverse space weather.

* * * * *